United States Patent [19]
Payne

[11] 4,086,947
[45] May 2, 1978

[54] TRACTION SHOE SEAL

[75] Inventor: Roger E. Payne, Akron, Ohio

[73] Assignee: The Goodyear Tire & Rubber Company, Akron, Ohio

[21] Appl. No.: 646,436

[22] Filed: Jan. 5, 1976

[51] Int. Cl.² ............................................. B60C 11/02
[52] U.S. Cl. ................................ 152/175; 305/35 EB
[58] Field of Search ......................... 305/11, 19, 46, 54, 305/35 EB, 38, 40; 152/173, 175, 176; 74/231 P, 232; 198/698; 15/244 C

[56] References Cited

U.S. PATENT DOCUMENTS

| 2,568,732 | 9/1951 | Hartdorn | 305/54 |
| 2,620,502 | 12/1952 | Russak | 15/244 C |
| 3,147,850 | 9/1964 | Ronceray | 198/698 X |
| 3,802,751 | 4/1974 | Beyers | 305/38 |
| 3,929,026 | 12/1975 | Hofmann | 74/231 P X |

FOREIGN PATENT DOCUMENTS 732,237  2/1943  Germany ............................ 305/46

Primary Examiner—Robert B. Reeves
Assistant Examiner—John P. Shannon
Attorney, Agent, or Firm—R. P. Yaist; Frederick K. Lacher

[57] ABSTRACT

A removable track for a tire having at least one sealing member interposed between the annular belt of the track and the traction shoes clamped on the belt. The sealing member is under compression and has a surface of highly compressible material to conform to irregularities in the track assembly for sealing the space between the traction shoes and the belt. The sealing member may be of rubber or plastic foam so that during compression and decompression the space occupied by the sealing member may decrease and increase while the sealing member maintains a sealing relationship with the traction shoes and belt. The sealing member may also be adhered to the belt-engaging surface of a traction shoe or to the belt. Further, the sealing member may be positioned between adjacent traction shoes with overhanging ribs of the shoes engaging the transverse edges of the sealing member to hold it in position and compress the edges. Grooves may be provided at the transverse edges of the sealing member for interaction with the overhanging ribs of adjacent traction shoes.

16 Claims, 11 Drawing Figures

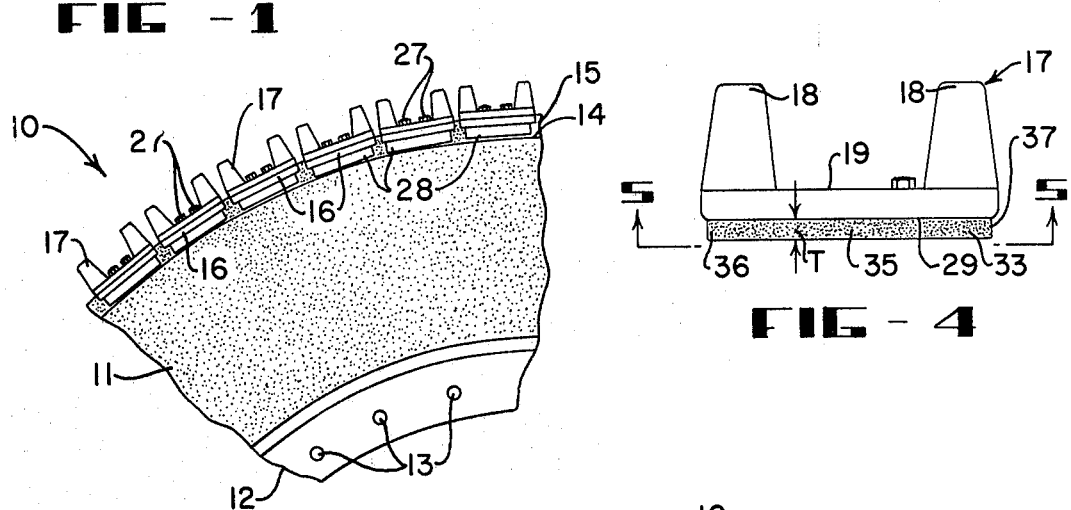
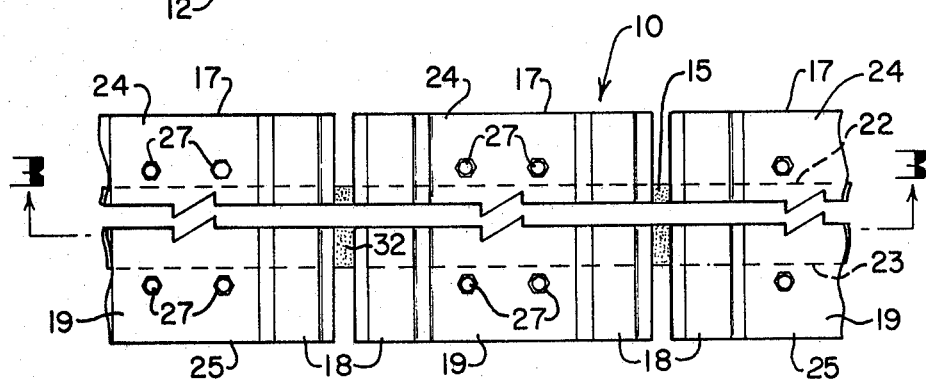
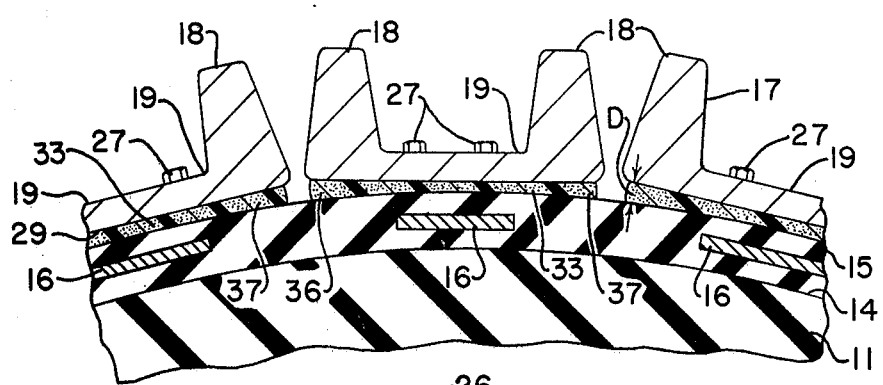
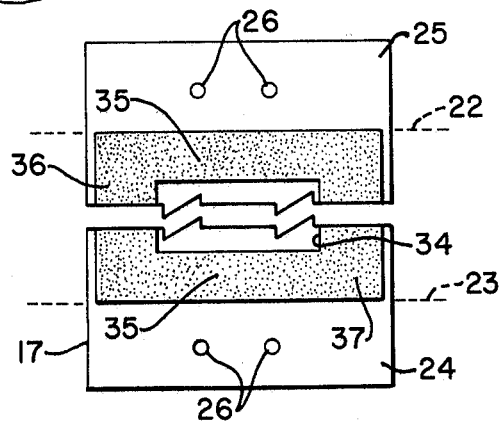

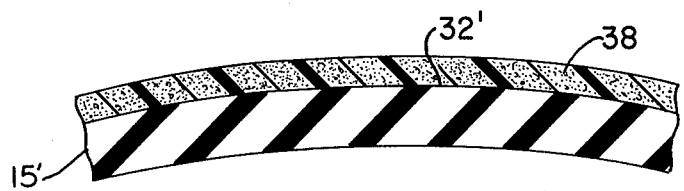
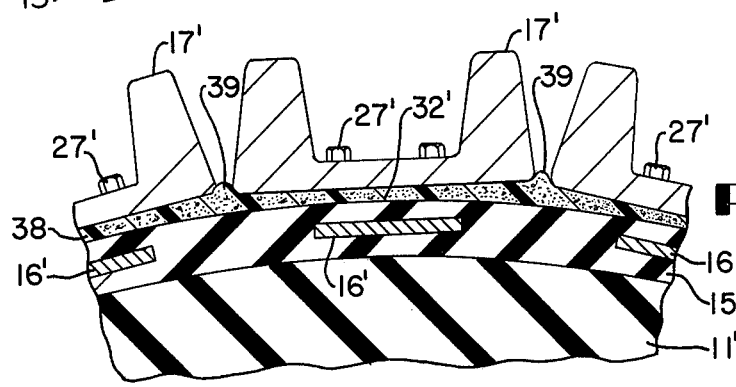
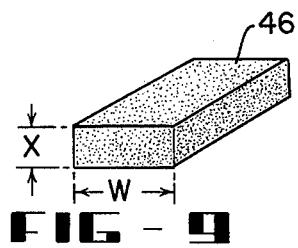
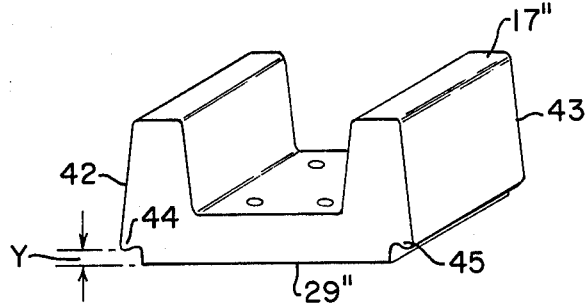
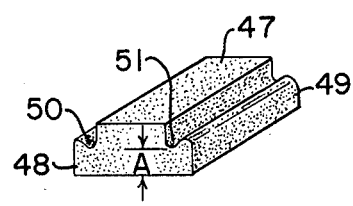
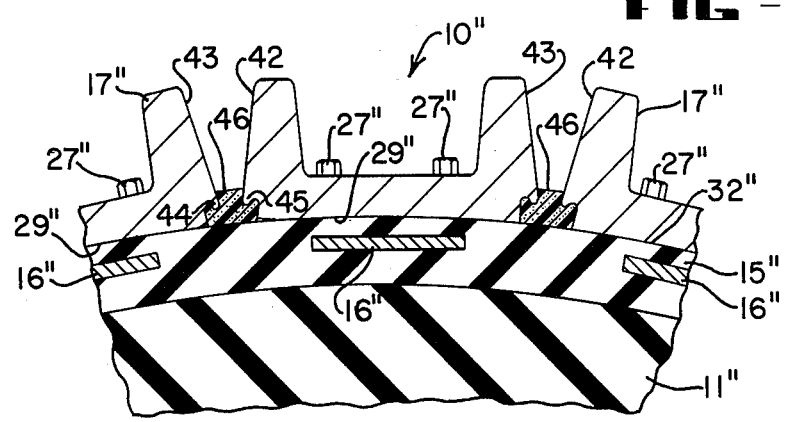

TRACTION SHOE SEAL

This invention relates generally, as indicated, to a removable track for an annular resilient tire. The track includes a substantially inextensible annular belt for mounting on the outer circumferential surface of the tire and wear-resisting metal traction shoes clamped on the radially outer surface of the belt. The track-tire assembly is especially suited for off-the-road use over rock or other abrasive materials. A tight seal is produced between the belt and the tire by inflation of the tire; however, wear of the belt under the shoes has been a problem because of dust, dirt and rock particles entering the spaces between the shoes and the belt.

Various devices have been proposed for sealing the space between the shoes and belt in the past including raised ribs on the belt surface for engaging the surfaces of the traction shoes. Because the material of the belt must have high tensile strength, adhesion to the reinforcing cords and other required properties such as weather resistance the sealing efficiency and capability of these ribs have been limited. This is because it has not been possible to provide the required belt properties as well as the optimum resilience and resistance to permanent compression set. Furthermore, in the manufacture of a track belt with raised ribs, it is difficult and costly to produce a molded body of reinforced rubber or other rubberlike material in which the ribs are accurately spaced for sealing engagement with the traction shoes. It can be appreciated that if the ribs are not in the correct locations on the belt, they may not be in sealing engagement with the traction shoes.

In other track designs, ribs have been provided in the belt-engaging surface of the shoes for engagement with the surface of the belt. Also, the leading and trailing edges of the shoes have been inclined to press against the belt surface. Here again, the seal is limited by the properties of the material of the belt which must be compounded and cured to provide minimum belt requirements and accordingly may not have the optimum sealing properties.

Sealing of the spaces between the shoes and belt has also been difficult due to the difference in thickness of the belt which results from rubber shrinkage and other manufacturing variables. The clamping of the shoes to the belt by mounting bars extending through the belt and fastened to the shoes at the ends also results in uneven compression forces across the belt making sealing difficult.

The shoes of the track are mounted for articulation upon flexing of the belt especially when the track engages the ground and several shoes make up the footprint in contact with the ground. Seals where the sealing material is fastened to both adjacent shoes have the disadvantage of being vulnerable to failure under the severe operating conditions of this track-tire assembly as it engages the ground. This is also true of fillers which have been used on conveyor belts to provide an uninterrupted surface. The links of these conveyor belts have not been subject to the stresses and adverse operating conditions of a track-tire assembly.

With the foregoing in mind, it is the principal object of this invention to provide for sealing the space between a traction shoe and a belt of a removable track to prevent the ingress of dirt, dust and other wear-producing materials.

Another object is to provide a sealing member having a surface which will conform to irregularities in the track assembly.

A further object is to provide a sealing member of a material which will decrease in volume during compression and increase in volume during decompression.

A still further object is to provide an assembly in which the sealing member operates under compression.

Another object is to provide a sealing member adhered to a member of the track assembly.

A further object is to provide a traction shoe trailing edge and leading edge configuration for clamping the sealing member located between adjacent shoes.

A still further object is to provide a sealing member trailing edge and leading edge configuration to interact with adjacent traction shoes.

These and other objects of the present invention may be obtainable with an assembly having a sealing member with a surface of highly compressible material to conform to irregularities in the track assembly for sealing the space between the traction shoes and the belt of the track. The sealing member is held in position for sealing by adherence to another member of the assembly or held in position by a special configuration of both the traction shoe and sealing member or of only the traction shoe.

To the accomplishment of the foregoing and related ends, the invention, then, comprises the features hereinafter fully described and particularly pointed out in the claims, the following description and the annexed drawings setting forth in detail a certain illustrative embodiment and modifications of the invention, these being indicative, however, of but four of the various ways in which the principles of the invention may be employed.

In the annexed drawings:

FIG. 1 is a fragmentary side elevational view of a removable track-tire assembly mounted on a rim.

FIG. 2 is an enlarged fragmentary plan view of the track of FIG. 1 with the center portion being broken away.

FIG. 3 is a fragmentary longitudinal sectional view taken along the plane of line 3—3 in FIG. 2.

FIG. 4 is a side elevational view of one of the traction shoes with the sealing member attached.

FIG. 5 is a view taken along the plane of line 5—5 in FIG. 4 with the center portion being broken away, showing the belt-engaging surface of the traction shoe.

FIG. 6 is a fragmentary longitudinal sectional view of a modified removable track belt with a cylindrical sealing member at the outer periphery.

FIG. 7 is a fragmentary longitudinal sectional view of the track-tire assembly showing the track belt of FIG. 6 with traction shoes clamped thereon.

FIG. 8 is a perspective view of a further modification showing a traction shoe with overhanging ribs at the leading and trailing edges.

FIG. 9 is a perspective view of a sealing member for use with the traction shoe of FIG. 8.

FIG. 10 is a fragmentary longitudinal sectional view of the track-tire assembly showing the traction shoe of FIG. 8 and sealing member of FIG. 9 clamped on a belt.

FIG. 11 is a perspective view of a sealing member embodying a further modification for use in the track-tire assembly of FIG. 10.

Referring to FIG. 1, a removable track assembly 10 is shown mounted on a tire 11 which in turn is mounted on a rim 12 for bolting on the wheel (not shown) by means of bolts extending through bolt holes 13 in the rim. The tire 11 may be an annular resilient body and in the preferred embodiment is inflatable. As shown more clearly in FIG. 3, the tire 11 has a radially outer circumferential surface 14 on which the belt 15 of the removable track assembly 10 is mounted.

The belt 15 is of a flexible material reinforced by cords of substantially inextensible material (not shown) so that upon inflation of the tire 11 the circumferential surface 14 will be urged radially outward into torque-transmitting engagement with the belt. Mounting bars 16 extending transversely of the belt 15 are molded in the belt at spaced-apart positions circumferentially of the belt for clamping traction shoes 17 on the belt at circumferentially spaced-apart positions. The traction shoes 17 are of a wear-resistant material such as steel and may have raised traction bars 18 at ground-engaging surfaces 19.

As shown in FIG. 2, the traction shoes 17 extend transversely away from edges 22 and 23 of the belt 15 providing end portions 24, 25 which extend beyond the edges of the belt. The mounting bars 16 project transversely from the edges 22 and 23 with the projections being inclined so that the radially outer surfaces of the mounting bars engage the radially inner surfaces of the end portions 24 and 25 of the traction shoes 17. The end portions 24 and 25 of the traction shoes 17 have holes 26 matching corresponding holes in the mounting bars 16 through which bolts 27 may be inserted for threaded engagement with threaded holes in retainer plates 28 located on the opposite sides of the mounting bars from the traction shoes. Upon tightening of the bolts 27, the traction shoes 17 are clamped to the belt 15. Each of the traction shoes 17 has a belt-engaging surface 29 with a generally flat configuration. The belt 15 has a radially outer surface 32 which is generally curved and accordingly when the traction shoes 17 are clamped on the belt 15, the distance D between the belt-engaging surface 29 and the radially outer surface 32 of the belt varies.

As shown in FIG. 4, a sealing member such as a relatively thick sheet 33 of resilient material having a surface of highly compressible material is adhered to the belt-engaging surface 29 of each of the traction shoes 17 by a suitable adhesive. The material of the sheet 33 may be from one-quarter to one-half inch thick and of a non-rigid foam containing a plurality of open or closed cells. Examples of materials that have the required properties of the sealing material are polyurethane "A" hardness of around 40 or a polyurethane rubber compounded for low hardness. The preferred material of the sheet 33 is polyurethane foam and has a skin at the outer surface and microcellular foam inside. The foam may have the following properties: a density of from 10 to 20 pounds per cubic foot, a tensile strength of 300 to 700 pounds per square inch, a crescent tear strength of 100 to 200 pounds, an elongation of 200 to 500 percent and a compression set of 20 percent after 22 hours at a temperature of 150° F. The skin of the sheet 33 may have the following properties: a density of approximately 60 pounds per cubic foot, a tensile strength of 2000 to 4000 pounds per square inch, a crescent tear strength of 250 to 500 pounds, an elongation of 200 to 500 percent and a compression set of 20 percent after 22 hours at a temperature of 150° F.

The open cell material of the sheet 33 is resilient for maintaining sealing engagement with the belt 15. When closed-cell material is used, the resiliency is supplemented by the contraction and expansion of the air or gas in the cells. This results in the sheet 33 sealing the space between each of the traction shoes 17 and belt 15. Specifically, the sheet 33, as shown in FIGS. 4 and 5, may have an opening 34 at the center and be adhered to the edges of the belt-engaging surface 29 of the traction shoes 17. As shown in FIG. 5, the sheet 33 of each of the shoes 17 does not extend beyond the edges 22 and 23 of the belt and therefore is not located between the ends of the mounting bars 16 and the end portions 24 and 25 of the traction shoes.

Preferably, the sheet 33 has a substantially uniform thickness T which is greater than the maximum distance D between the belt-engaging surface 29 and the radially outer surface 32 of the belt 15. Accordingly, when the traction shoes 17 are mounted on the belt 15, the sheet 33 of each of the shoes is held in compression. As shown in FIG. 3, a middle portion 35 of the sheet 33 is under greater compression than edge portions 36 and 37 of the sheet which are spaced circumferentially from the middle portion. The sheet 33 of each of the shoes 17 is flexible and expands and contracts with the movements at the interfaces between the belt 15 and traction shoes 17 as the tire 11 and removable track assembly 10 rotate.

The sheet 33 may be adhered to the belt-engaging surface 29 of each of the shoes 17 by a suitable adhesive prior to mounting of the shoes on the belt 15. During mounting, the foam material of the sheet 33 is compressed and forms a barrier preventing dirt, rocks and moisture from entering the space between each of the shoes 17 and the belt 15. In the present embodiment, a unitary sheet 33 of foam material having an opening 34 is shown; however, it is understood that this sealing member may be provided by adhering four or more strips of foam material to the edges of the belt-engaging surface 29 of each of the traction shoes 17. It is also contemplated that in certain applications a continuous sheet 33 without an opening 34 may be used to seal the space between each of the traction shoes 17 and the belt 15.

With reference to FIGS. 6 and 7, a modification is shown in which a removable track assembly 10' is mounted on a resilient tire 11' and includes a belt 15' on which traction shoes 17' are clamped. The belt 15' is of flexible material such as rubber and is reinforced by substantially inextensible cords (not shown). Mounting bars 16' are molded in the belt 15' and the ends of the mounting bars are fastened to the traction shoes 17' by fasteners such as bolts 27'.

A sealing member such as a cylindrical layer 38 of resilient material having a surface of highly compressible material such as non-rigid foam is adhered to a radially outer surface 32' of the belt 15'. The material of the layer 38 has similar properties to those set forth above for sheet 33 of the construction shown in FIGS. 1 through 5. The layer 38 extends continuously around the belt 15' and covers the radially outer surface 32'. When the traction shoes 17' are clamped on the belt 15', the portions of the layer 38 between the shoes are compressed, as shown in FIG. 7. Intermediate portions 39 of the layer 38 extend radially outward between the transversely extending edges of the traction shoes 17'. In the present embodiment, the layer 38 has a thickness of from one-quarter inch to one-half inch and when the traction shoes 17' are bolted on the belt 15', the portions of the layer under the traction shoes are under compression. Then as the removable track assembly 10' and tire 11' rotate, there is relative movement of the traction shoes 17' and belt 15' especially at the ground-engaging zone where the radius of the tire and belt is decreased.

As this movement occurs, the layer 38 with the intermediate portions 39 extending radially outward between the traction shoes 17' forms a barrier to prevent dirt, rocks and moisture from entering the space between the traction shoes and the belt 15'.

With reference to FIGS. 8, 9 and 10, a further modification is shown in which a removable track assembly 10" has traction shoes 17" which are clamped on a belt 15" mounted on a resilient tire 11" as by mounting bars 16" and bolts 27". As shown more clearly in FIG. 8, each of the traction shoes 17" has a leading edge 42, a trailing edge 43 and a belt-engaging surface 29". At the junctions of the leading edge 42 and trailing edge 43 with the belt-engaging surface 29" overhanging ribs 44 and 45 are provided on the leading edge 42 and trailing edge 43, respectively.

A sealing member such as sealing strip 46 having a length substantially equal to the width of the belt 15" is located on the radially outer surface 32" of the belt between the leading edge 42 and trailing edge 43 of adjacent traction shoes 17". The sealing strip 46 has a width W greater than the distance between the ribs 44 and 45 of adjacent traction shoes 17" which overlap the edges of the sealing strip. The sealing strip 46 has a thickness X which is greater than the distance Y between the ribs 44 and 45 and the plane of the belt-engaging surface 29" so that upon installation, as shown in FIG. 10, the ribs 44 and 45 will penetrate the edge surfaces of the sealing strip 46 and provide a compression seal. This also provides a mechanical locking of the sealing strips 46 in place on the belt 15".

The sealing strip 46 is preferably of a resilient material having surfaces of highly compressible material such as non-rigid foam containing a plurality of cells. The material of the sealing strip 46 has similar properties to those set forth above for sheet 33 of the construction shown in FIGS. 1 through 5. The cells in the sealing strip 46 contain air or gas which upon compression of the material is compressed and on decompression expands to maintain the surfaces of the sealing strip in sealing engagement with the surfaces of each of the traction shoes 17".

Referring to FIG. 11, a further modification is shown in which a sealing strip 47 of resilient material having a highly compressible material at the surface and adaptable for installation in the track assembly 10" shown in FIG. 10 is illustrated. The sealing strip 47 has transverse edges 48 and 49 which in the installed condition extend axially of the belt 15". Grooves 50 and 51 extend along the transverse edges 48 and 49. The thickness of the sealing strip 47 at the grooves 50 and 51 is indicated by letter A in FIG. 11 and is preferably of a dimension so that upon installation the material at the grooves will be compressed. Where the sealing strip 47 is used in a removable track assembly such as that shown in FIG. 10 with traction shoes of the type indicated by numeral 17", the thickness A at the grooves 50 and 51 is preferably greater than the distance Y between the overhanging ribs 44 and 45 and the belt-engaging surface 29". With this construction, the overhanging ribs 44 and 45 will interact with the grooves 50 and 51 compressing the sealing strip 47 and providing a seal effective to prevent the entrance of dirt, rocks and moisture into the space between the traction shoes 17" and the belt 15" in the assembly shown in FIG. 10. It is also understood that the sealing strip 47 may be used with traction shoes which do not have overhanging ribs but which have leading and trailing edges overlapping the transverse edges 48 and 49 at the grooves 50 and 51 so that the edges are in compression when the traction shoes are clamped to the belt.

While certain representative embodiments and details have been shown for the purpose of illustrating the invention, it will be apparent to those skilled in the art that various changes and other modifications may be made therein without departing from the invention.

What is claimed is:

1. A removable track assembly comprising a plurality of wear-resistant traction shoes, a flexible annular belt for mounting on a resilient tire, said traction shoes being clamped on said belt at circumferentially spaced-apart positions, at least one sealing member interposed between said traction shoes and said belt under compression and said sealing member having a surface of highly compressible material whereby said surface conforms to irregularities in said track assembly to seal the spaces between said traction shoes and said belt.

2. A removable track assembly in accordance with claim 1 wherein said sealing member is of a resilient material having a plurality of cells whereby upon compression of said sealing member the space occupied by said sealing member is decreased while maintaining said sealing member in sealing engagement with the surfaces of said belt and traction shoes.

3. A removable track assembly in accordance with claim 2 wherein said resilient material is a nonrigid foam material having spaced-apart cells and a skin at the surface.

4. A removable track assembly in accordance with claim 1 wherein said belt is deflected and said traction shoes are moved relative to each other and to said belt during operation changing the distance between said traction shoes and said belt and said sealing member having a thickness greater than the maximum distance between said traction shoes and said belt to maintain said sealing member in compression.

5. A removable track assembly in accordance with claim 3 wherein said foam material has a density of from 10 to 20 pounds per cubic foot and a tensile strength of from 300 to 700 pounds per square inch; and said skin has a density of around 60 pounds per cubic foot and a tensile strength of from 2000 to 4000 pounds per square inch.

6. A removable track assembly in accordance with claim 5 wherein said foam material has a crescent tear strength of from 100 to 200 pounds and an elongation of from 200 to 500 percent; and said skin has a crescent tear strength of from 250 to 500 pounds and an elongation of from 200 to 500 percent.

7. A removable track assembly in accordance with claim 1 wherein each of said traction shoes has a belt-engaging surface and said sealing member is adhered to said belt-engaging surface for sealing engagement with said belt.

8. A removable track assembly in accordance with claim 7 wherein said sealing member has an opening generally at the center of said member and said sealing member is adhered to the edges of said belt-engaging surface.

9. A removable track assembly in accordance with claim 7 wherein said belt-engaging surface is generally flat and said belt surface is generally curved, said sealing member having a substantially uniform thickness prior to compression between said belt-engaging surface and said belt surface whereby a middle portion of said sealing member is compressed a greater amount than edge portions spaced circumferentially from said middle portion to maintain a sealing engagement with said belt surface across the length and width of said belt-engaging surface.

10. A removable track assembly in accordance with claim 1 wherein said sealing member is a cylindrical layer adhered to a traction shoe engaging surface of said belt and each of said traction shoes has a belt-engaging surface in clamping engagement with a radially outer surface of said cylindrical layer whereby said layer is compressed to provide sealing engagement of said traction shoes with said belt surface.

11. A removable track assembly in accordance with claim 10 wherein said cylindrical layer substantially covers said shoe-engaging surface of said belt and said traction shoes are clamped to said belt over said cylindrical layer whereby said layer is compressed where said traction shoes are clamped to said belt and intermediate portions of said cylindrical layer extend radially outward between said traction shoes.

12. A removable track assembly in accordance with claim 11 wherein said cylindrical layer is of resilient material having a plurality of cells whereby upon compression of said layer, the space occupied by said layer between said shoe-engaging surfaces of said belt and said belt-engaging surfaces of said shoes is decreased and upon decompression of said sealing layer, the space occupied by said layer is increased to maintain sealing engagement of said layer with the belt-engaging surfaces of said traction shoes.

13. A removable track assembly in accordance with claim 1 wherein said sealing member is positioned between said traction shoes and each of said traction shoes has a leading edge and a trailing edge spaced circumferentially of said belt, said leading edge and said trailing edge each having an overhanging rib spaced from said belt a distance less than the thickness of said sealing member for penetration of said sealing member by said rib to grip said sealing member in a sealing position between said trailing edge and said leading edge of adjacent traction shoes.

14. A removable track assembly in accordance with claim 13 wherein said sealing member is of a resilient material having a plurality of cells containing a gas whereby upon compression of said sealing member, said gas is compressed and the space occupied by said sealing member is decreased and upon decompression of said sealing member said gas expands and the space occupied by said sealing member is increased to maintain said sealing member in said sealing position between said trailing edge and said leading edge of adjacent traction shoes.

15. A removable track assembly in accordance with claim 13 wherein said sealing member has transverse edges extending axially of said belt, each of said transverse edges having a transversely extending groove and said rib of each said leading edge and said trailing edge of said traction shoes extending into said groove at one of said transverse edges, said sealing member having a thickness at said groove greater than the distance between said rib and said belt whereby upon clamping of said traction shoes to said belt said sealing member at said groove will be compressed by said rib.

16. A removable track assembly in accordance with claim 15 wherein said sealing member is a resilient material having a plurality of cells containing a gas whereby upon compression of said sealing member said gas is compressed and the space occupied by said sealing member is decreased and upon decompression of said sealing member said gas expands and the space occupied by said sealing member is increased to maintain said sealing member in said sealing position between said trailing edge and said leading edge of adjacent traction shoes.

* * * * *